APPARATUS FOR PLURAL IMAGE PROJECTION

Filed June 21, 1962 4 Sheets-Sheet 1

INVENTORS
VICTOR L. REDDLE
KURT H. HOPPMANN
STANLEY F. STAPLES
BY John Gibson Semmes
ATTORNEY

APPARATUS FOR PLURAL IMAGE PROJECTION

Filed June 21, 1962

4 Sheets-Sheet 2

INVENTORS
VICTOR L. REDDLE
KURT H. HOPPMANN
STANLEY F. STAPLES
BY
John Gibson Semmes
ATTORNEY INVENTORS
VICTOR L. REDDLE
KURT H. HOPPMANN
STANLEY F. STAPLES
BY John Gibson Semmes
ATTORNEY

APPARATUS FOR PLURAL IMAGE PROJECTION

Filed June 21, 1962

INVENTORS
VICTOR L. REDDLE
KURT H. HOPPMANN
STANLEY F. STAPLES
BY John Gibson Semmes
ATTORNEY 3,169,442
APPARATUS FOR PLURAL IMAGE PROJECTION
Victor L. Reddle, McLean, Kurt H. Hoppmann, Falls Church, and Stanley F. Staples, Alexandria, Va., assignors to Hoppmann Corporation, a corporation of Delaware
Filed June 21, 1962, Ser. No. 204,193
7 Claims. (Cl. 88—24)

The present invention is a continuation-in-part of applicants' Apparatus for Dual Image Projection Upon a Single Screen, application No. 799,788, filed March 16, 1959, now Patent No. 3,040,622 issued June 26, 1962.

The present invention relates to audio-visual teaching aids, particularly a mobile housing wherein a plurality of projection means may be positioned for cooperative projection of plural images upon a single screen.

In the parent application a housing was provided wherein a single mirror system enabled simultaneous or selective utility of slide projector and motion projector components for viewing upon a single screen. According to the present improvement, the housing is modified both internally and externally so as to provide for exteriorly positioned stage plates which enable "overhead viewing" of transparencies and viewing of opaque matter through the same screen and mirror system. Since both the transparency and opaque members are supported in the outside of the cabinet, an instructor or lecturer can conveniently modify the slide projector or motion picture presentation with selective transparencies or opaque matter. Furthermore, since the transparencies are illuminated by means of an overhead device, the lecturer's actual hand or pointing stick may be used upon the transparency and its image projected upon the viewing screen.

The present apparatus promises exceptional versatility as a teaching aid, since slide projector and motion picture projector, may be used simultaneously, individually or in combination. When neither the slide nor motion picture projector are being used the transparency and opaque projection devices may be employed. Accordingly, there is provided a classroom, advertising or like viewing system wherein a plurality of differing projection components are housed and by means of a single mirror system their images are presented upon a single viewing screen.

Accordingly, it is an object of invention to provide a cabinet with a mirror system for rear view projection of the visual images cast by a multiplicity of projectors.

Another object of invention is to provide in a rear view projection apparatus, transparency and opaque viewing components.

Another object of invention is to provide in a projection cabinet, a mirror system for transparency overhead and opaque viewing components.

Another object of invention is to provide a mobile and durable cabinet for housing a projection screen and a plurality of projection components.

Yet, additional objects of invention will become apparent from the ensuing specification and attached drawings wherein:

FIG. 1 is a front perspective view of the projector housing 12 with screen housing 14 supported on top thereof, and the transparency and opaque housing 70 supported at its side;

Figure 6:
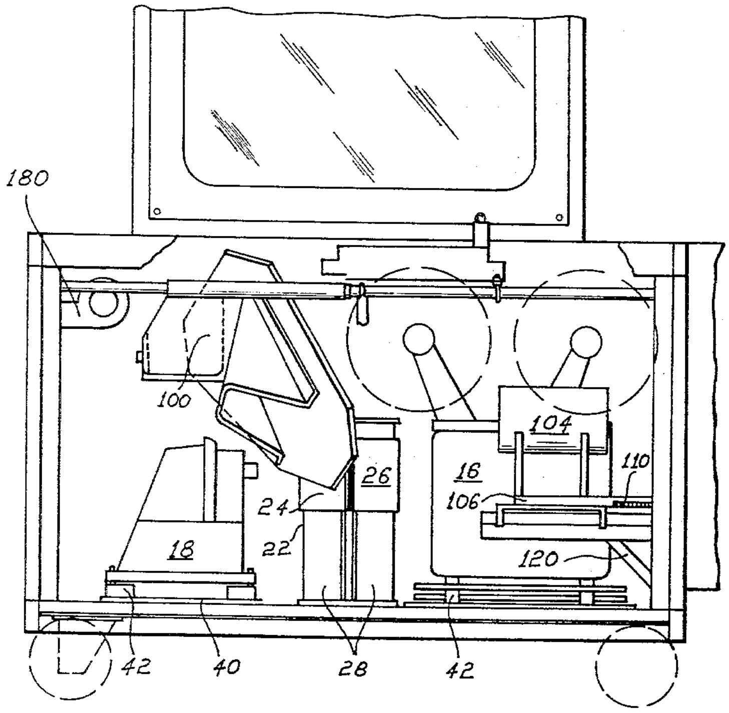
Figure 7:
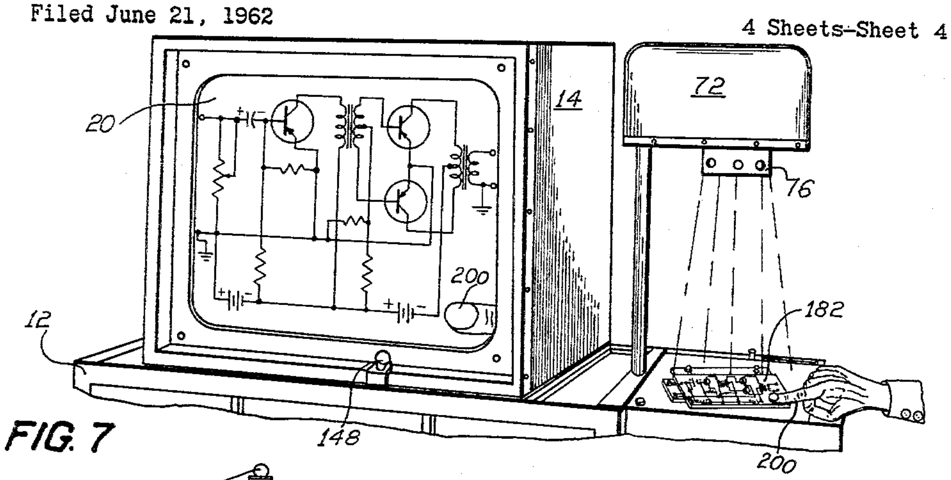
Figure 8:
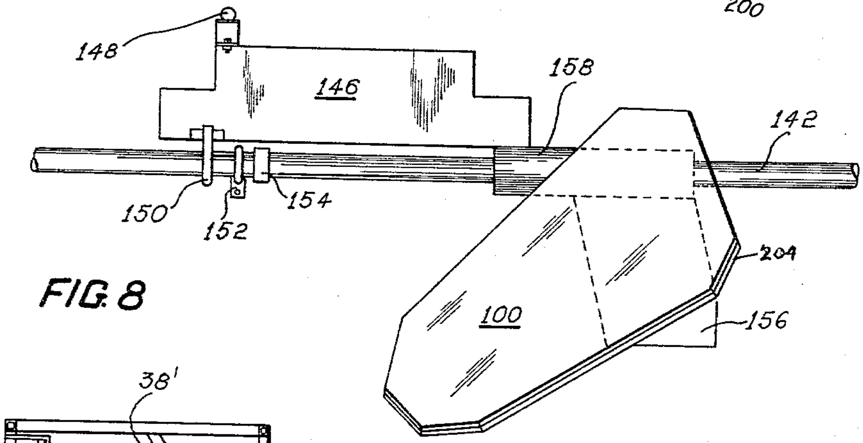
Figure 9:
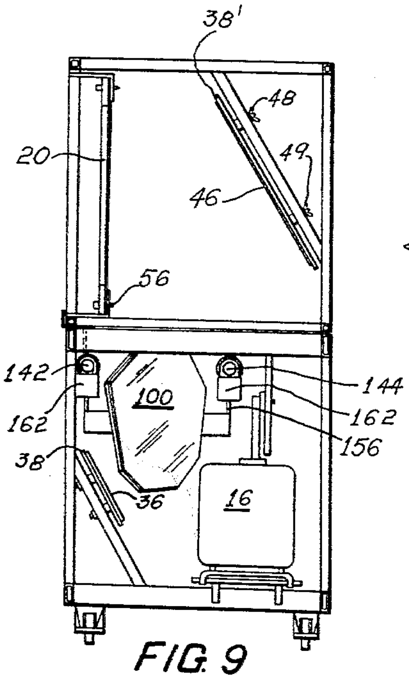
Figure 10:
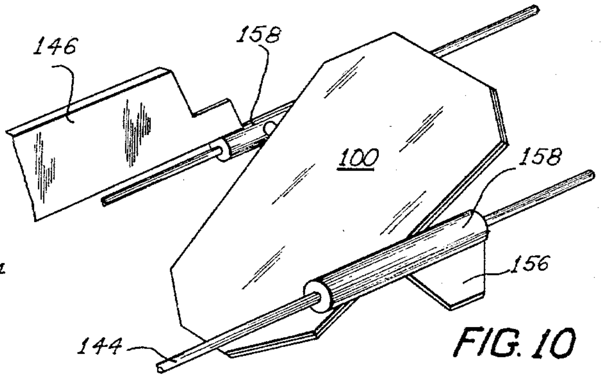

FIG. 6 is side elevation through the projection housing 12 with the sides removed, showing the mounting of supplemental secondary mirror 100 and lens 104 components with respect to the slide and motion projector;

FIG. 7 is a front elevation of the screen housing and transparency stage support showing the illumination of the transparency 182 as well as the forefinger 200 of the instructor upon viewing screen 20;

FIG. 8 is an enlarged side elevation of angularly supported supplemental secondary mirror 100;

FIG. 9 is an end elevation of the projector housing showing positioning of mirror and projection components; and FIG. 10 is yet another perspective of supplemental secondary mirror 100 and rod means 142 and 144 for supporting same in the housing.

Figure 1:
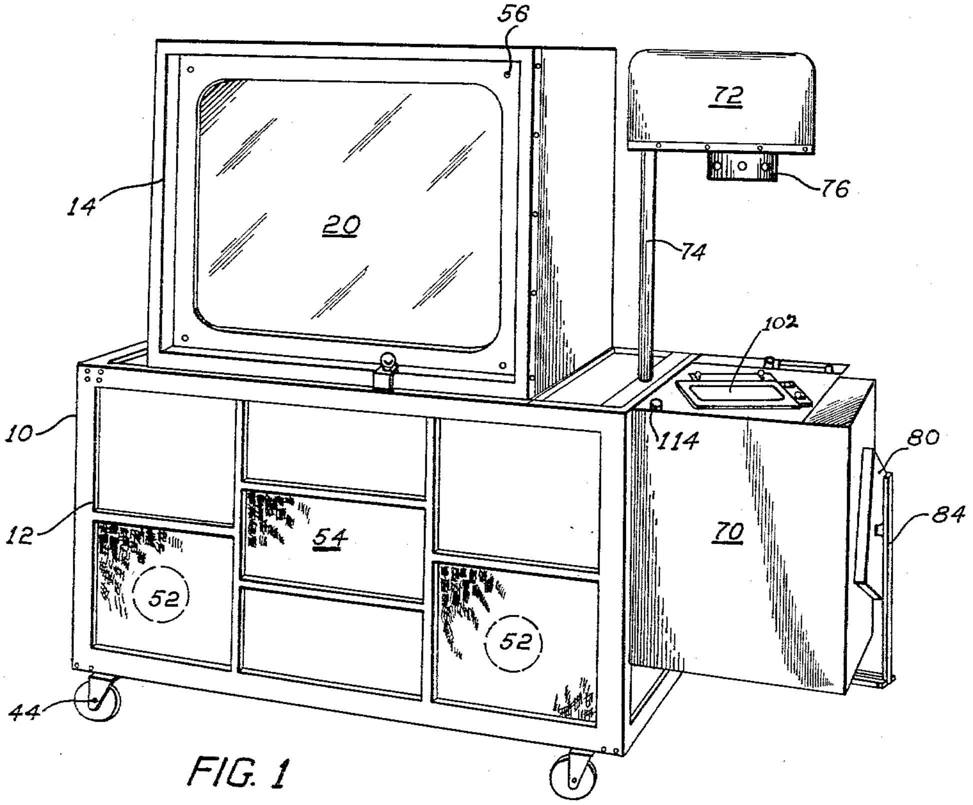
Figure 2:
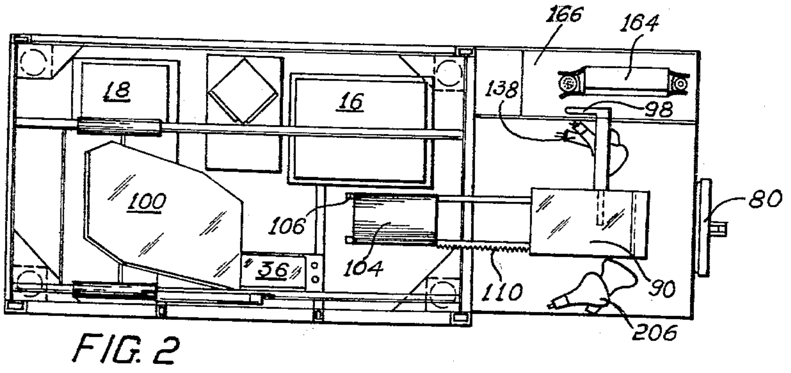
FIG. 2 is a top plan thereof partially in section with the screen housing removed, illustrating the mirror system therefor.

In FIG. 1 an upstanding cabinet 10 is designated as having lower projection housing 12 and upper screen housing 14. Films and script material may be conveniently stored upon a tray (not illustrated) mounted in upper screen housing 14 preferably behind mirror 46 and its appropriate mounting means. Cabinet 10 may be mounted upon rollers or wheels 44. The cabinet frame may be of welded tubular steel, providing rigidity and thus maintaining optical alignment of mirrors. A vertically disposed plastic screen 20 is mounted by means of pawl fasteners 56 within the screen housing. Plastic screen 20 may have on one side a projection surface constructed of rigid plastic such as is sold under the trademark "Plexiglas." This rigid plastic may be formed to embody antistatic properties and thus reduce the accumulation of dust.

As illustrated also in FIG. 1, speakers 52 may be mounted in the front of projector housing 12 and perforated aluminum screens 54 may serve as covered outlet for the speakers as well as portals for ventilation of the entire cabinet. In lieu of or in addition to cabinet-mounted speakers 52, external or room-positioned speakers might be utilized through switch and socket means (not illustrated). Forced-air ventilation may be provided by mounting conventional fan means 180 within cabinet 10. Unit control 164 may be mounted in the top of housing 70 affording complete operational control of the projectors and speakers. Actual loading of the projectors is accomplished by sliding doors or the like postioned in the rear of housing 12.

As illustrated in FIG. 6, a motion projector 16 and a slide projector 18 may be oppositely mounted within projector housing 12. Both projectors may be secured to mounting sockets 42 which, in turn, are fastenable to projector support plates 40. Since conventional motion picture film is employed, unusual threading of the film, as in the case of most conventional rear view projector apparatus, is not required.

Intermediately disposed between the projectors is the primary reflecting means including polygonal mirror mount 22. Rear view front surface mirrors 24 and 26, are adjustably mounted on adjoining mirror mount side plates 28, so as to reflect alternately or simultaneously images cast by the opposed projectors.

As illustrated in FIGS. 6 and 9, secondary, rear surface mirror 36 is obliquely mounted against the front of projector housing 12 upon mirror backing plate 38. A tertiary, rear surface mirror 46 is obliquely mounted upon mirror backing plate 38' in the rear of screen housing 14. Both secondary and tertiary mirror backing plates 38 are adjustable laterally by means of threaded bolts 48 and wing nuts 49. The lateral adjustment of plates 38 as well as plates 28 (upon the polygonal mount 22) provide fine focusing of the visual images cast upon screen 20.

As will be apparent, images cast by projectors 16 and 18 are reflected in rear view upon secondary mirror 36 and thence upon tertiary mirror 46 and onto plastic screen 20.

Figures 3, 4:
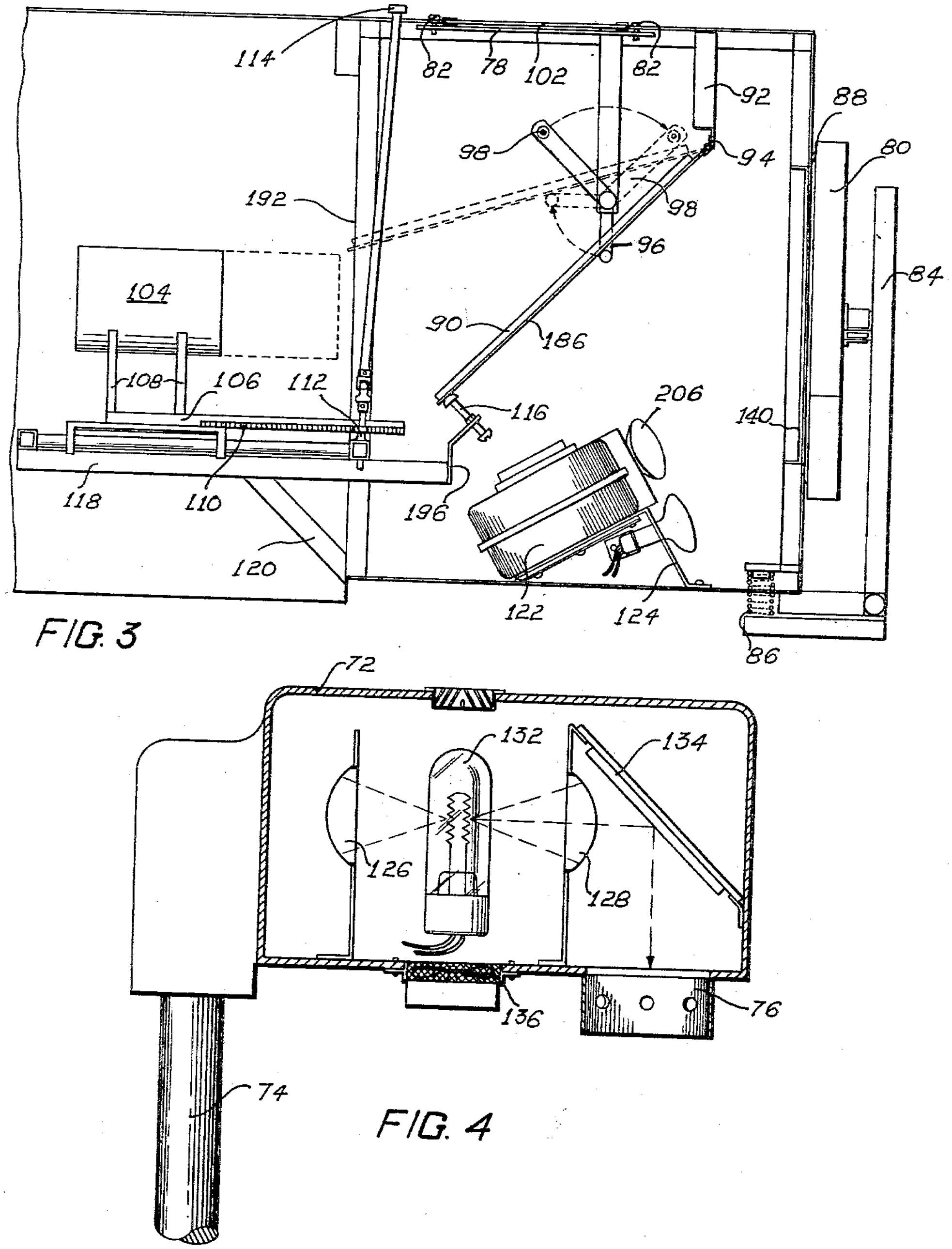
FIG. 3 is a side elevation through the transparency and opaque projection housing, showing supplemental primary mirror 90 and lens 104 system.
FIG. 4 is an enlarged cross-section of the overhead illumination housing 72.

Combined transparency and opaque viewing housing 70 may be supported at one end of projector housing 12, and have overhead lamp housing 72 positioned above by means of tubular or like stand 74 extending vertically from the projector housing. A hood 76 may be employed to direct the light from its bulb source 132 towards the transparency stage plate 102. As illustrated in FIG. 4, the stage lamp housing 72 may have supported inwardly thereof bulb 132 intermediate reflector lens 126 and lens 128, the light proceeding through lens 128 against mirror 134 thence being reflected downwardly toward stage plate 102.

The interior of the transparency and opaque viewing housing 70 is particularly illustrated in FIG. 3, which shows stage plate 102 mounted at the top of the housing and condensing lens 78 supported immediately beneath the stage plate 102 by means of set screw supports or the like 82. An opaque viewing pressure plate 80 is supported against opaque viewing stage plate 140 at one end of the housing by means of spring loaded pressure arm 84 which is pivoted at the bottom of the housing and urged against the stage plate 140 by means of spring 86. Pressure pad 80 may have at its opaque matter contacting end a foam or like pad 88.

For both transparency and opaque viewing, a supplemental secondary mirror 100 is supported at the opposite end of projector housing 12 by means of mirror support cradle 156 attached to sleeve 158 which slides upon longitudinal support rods 142 and 144 mounted in the front and sides of the housing by means of rod support blocks 162, or the like. Sleeve 158 is attached to guide piece 146 which in turn is supported by U-bolt 150 to the longitudinal rod 142. Rod 142 may be secured similarly to the sides of the housing by U-bolt 152. A stop piece 154 may be fixed to rod 142 for engaging sleeve 158. Mirror backing 204 may be integral with cradle 156 or adjustably connected to the cradle by set screws or the like. Mirror 100 is movable upon rod 142 by means of guide key 148 projecting through the front of the housing in order that it may be removed from the slide and motion picture projector light path when not being used for either transparency or opaque projection. Support rods 142 and 144 may be supported at their ends by support blocks 162 attached to the interior walls of housing 12.

For transparency viewing a supplemental primary front surface mirror 90 is supported in housing 70 by means of bracket 92 which is attached to mirror support piece 186 by hinge 94. For transparency viewing the mirror 90 is pivoted from its upper position shown in phantom by means of pivoted arm 98 and with mirror support end 96. Arm 98 extends through the rear of the housing 70 into the recessed control portion 166. Light reflected through the transparency 182 is directed into the housing 12 through aperture 192 and thence through lens 104 which is supported by legs 108 upon sleeve 106 engaging support 118 which is reinforced inwardly of the housing by brace 120. Lens 104 is longitudinally adjustable with respect to mirror 90 by means of rack 110 attached to sleeve 106 and pinion 112 which is supported upon tube 118 and is revolved by means of rod 194 and control knob 114 which extends through the top of housing 70. Mirror 90 is limited in lower movement by means of adjustable stop 116 which is attached to tube 118 by means of clip support 196. Also, a rotary blower 122 may be supported in the bottom of housing 70 by means of bracket 124 to offset the heat inducing effects of opaque reflecting lamps 206.

During opaque viewing pressure pad 80 is pulled away from housing 70 and a sheet of opaque matter may be set against stage plate 140. Spring 86 then urges the pressure pad to press the opaque piece against the stage plate. Mirror 90 is then reverted to its upper position by means of handle 98, lamps 206 are lit and blower 122 started. Accordingly, the opaque matter will be reflected through aperture 192 into lens 104 and thence against supplemental secondary mirror 100, tertiary mirror 46 and onto projector screen 20. If the transparency is to be projected as shown in FIG. 7, mirror 90 is lowered, and the opaque lamps 206 and blower 122 may be turned off. Then, light may be reflected, directly from housing 72 through the transparency, against mirror 90 and thence through lens 104 onto supplemental secondary mirror 100 and thence onto tertiary mirror 46 and screen 20. An auxiliary blower 180 illustrated in FIG. 6 may also be employed in the projector housing.

Figure 5:
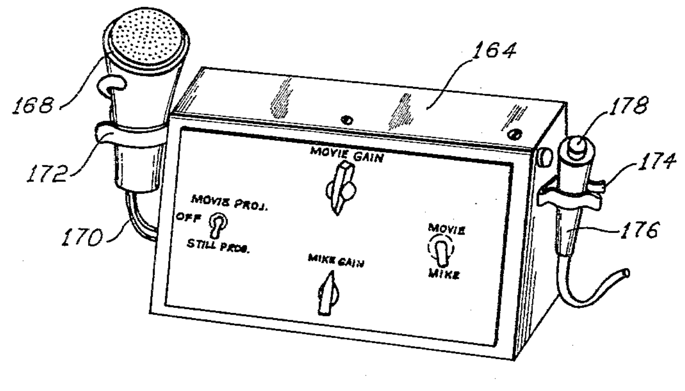
FIG. 5 is an enlarged perspective of a control panel 164 mounted within the top of transparency and opaque housing 70.

As illustrated in FIG. 5, a remote control panel 164 may be mounted in housing 70 recessed portion 166 and may comprise the manual movie, microphone and still projector controls illustrated thereon. The entire remote control panel 164 assembly may be removed from housing 70 and carried to a speaking lectern or the like, since its electrical connections to the actual components in the projection housing may be by means of twenty foot or longer extension cable. Also, a microphone 168 may be supported in panel 164 by clip 172 and may include extensible wire 170 leading to amplifying system (not illustrated) so that the lecturer may address his audience while standing at a distance from the housing or control panel 164. Also, there is provided a remote control piece 176 having slide change or similar control button 178 at the end thereof and supported by clip 174. The control button 178 may be wired also to activate any number of the opaque viewing still or motion picture projector controls. However, a primary utility of the button will be for the changing of still projector slides while the lecturer continues uninterruptedly his lecture.

Manifestly, numerous adjustability refinements, interchangeability of parts and means for supporting the mirror system may be devised without departing from the spirit and scope of the invention as defined in the subjoined claims.

What is claimed is:

1. In a cabinet having a lower projection portion, at least two projection components supported on the floor of said projection portion and an upper visual screen portion, having a screen mounted in the front of said visual screen portion:

(A) a primary reflecting means comprising front surface mirrors laterally adjustably fixed to an upstanding mount of polygonal cross section positioned intermediate said projection components and vertically extending side plates supported upon said mount and transversely adjustable with respect to said mount by means traversing said plates and said mount, at least two reflecting mirrors fixed to adjoining plates, said mirrors being inclined towards each other and each being positioned respectively in the path of light from each of said projection components;

(B) a secondary reflecting means comprising a front surface mirror adjustably inclined in the lower projection portion of said cabinet between said floor and the front of said cabinet in the path of light of said mirrors comprising the primary reflecting means so as to reflect upwardly images reflected by said primary reflecting means;

(C) a tertiary reflecting means comprising a rear surface mirror adjustably inclined in the upper screen portion between the rear and top of said cabinet in the path of light of said front surface mirror comprising the secondary reflecting means so as to reflect images reflected by said secondary reflecting means horizontally against said screen in the front of said cabinet; and, (D) a transparency stage plate positioned as an exterior portion of said housing together with a light source supported outwardly from said housing so that exterior light is transmittable through said stage plate onto said mirror system.

2. Apparatus as in claim 1 including an opaque stage plate with pressure pad positioned as an exterior portion of said housing in optical alignment with said primary reflecting means.

3. Apparatus as in claim 2, including a supplemental primary and secondary reflecting means adjustably positioned in said housing intermediate said transparency stage plate and said tertiary reflecting means.

4. Apparatus as in claim 3, including lens means positioned in said housing intermediate said supplemental primary and secondary reflecting means in the path of reflected light from said opaque viewing stage plate.

5. An apparatus for plural image projection upon a screen comprising:

(A) a projector housing supporting said screen and a first projector and a second projector;

(B) a mirror system consisting of primary, secondary and tertiary mirrors mounted in said housing so as to reflect images from said first and second projectors onto said screen;

(C) a transparency stage plate positioned as an exterior portion of said housing together with a light source supported outwardly from said housing so that exterior light is transmittable through said stage plate onto said tertiary mirror;

(D) an adjustable lens positioned in said housing intermediate said transparency stage plate and said mirror system so as to focus the image from a transparency positioned on said stage plate;

(E) a transparency primary reflecting mirror positioned intermediate said transparency stage plate and said lens so as to reflect said light upon said mirror system; and (F) a supplemental secondary mirror positioned in said housing intermediate said lens and said tertiary mirror, so as to reflect onto said tertiary mirror light focused by said lens.

6. An apparatus for plural image projection upon a screen comprising:

(A) a projector housing supporting said screen and a first projector and a second projector;

(B) a mirror system consisting of primary, secondary and tertiary mirrors mounted in said housing so as to reflect images from said first and second projectors onto said screen;

(C) a transparency stage plate positioned as an exterior portion of said housing together with a light source supported outwardly from said housing so that exterior light is transmittable through said stage plate onto said tertiary mirror;

(D) an adjustable lens positioned in said housing intermediate said transparency stage plate and said mirror system so as to focus the image from a transparency positioned on said stage plate;

(E) a transparency primary reflecting mirror positioned intermediate said transparency stage plate and said lens so as to reflect said light upon said mirror system;

(F) a supplemental secondary mirror positioned in said housing intermediate said lens and said tertiary mirror, so as to reflect onto said tertiary mirror light focused by said lens; and (G) an opaque viewing stage plate with pivoted pressure pad, positioned on the exterior of said housing in optical alignment with said lens.

7. An apparatus as in claim 6, said transparency reflecting mirror being pivotable away from the reflecting path between said opaque viewing stage plate and said lens.

References Cited by the Examiner

UNITED STATES PATENTS

| | | | |
|---|---|---|---|
| 1,158,429 | 11/15 | Barton | 88—26 |
| 1,282,224 | 10/18 | Hardyman | 88—24 |
| 1,954,787 | 4/34 | Bright et al. | 88—24 |
| 2,273,936 | 2/42 | Ceroni | 88—26 |
| 2,351,618 | 6/44 | Katz | 88—24 |
| 2,525,957 | 10/50 | Schuler | 88—24 |
| 3,040,622 | 6/62 | Reddle et al. | 88—24 |

NORTON ANSHER, *Primary Examiner.*

EMIL G. ANDERSON, *Examiner.*